Oct. 2, 1962 S. A. SCHERBATSKOY 3,056,885
STABILIZED SPECTROMETER
Filed March 21, 1960 3 Sheets-Sheet 2
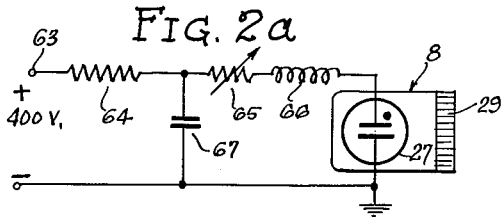
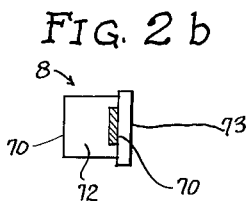
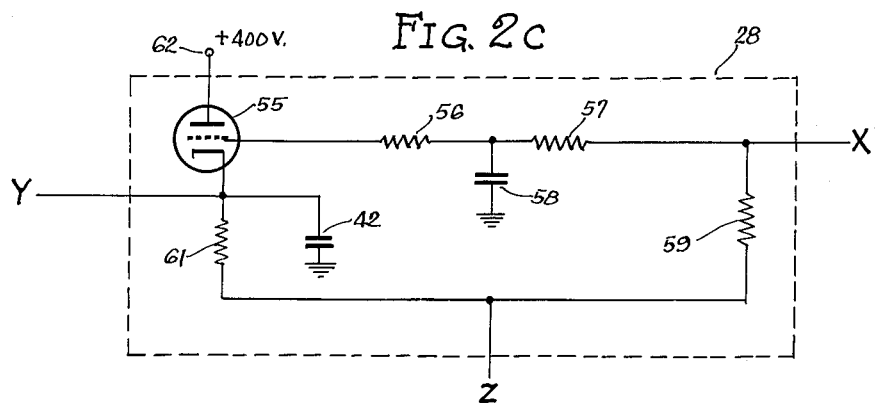
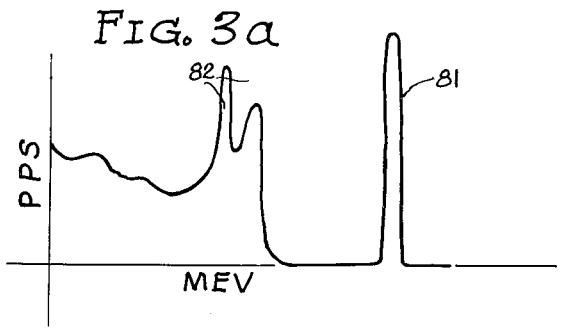
INVENTOR.
Serge A. Scherbatskoy
BY
Ooms, McDougall, Williams & Hersh
Attorneys

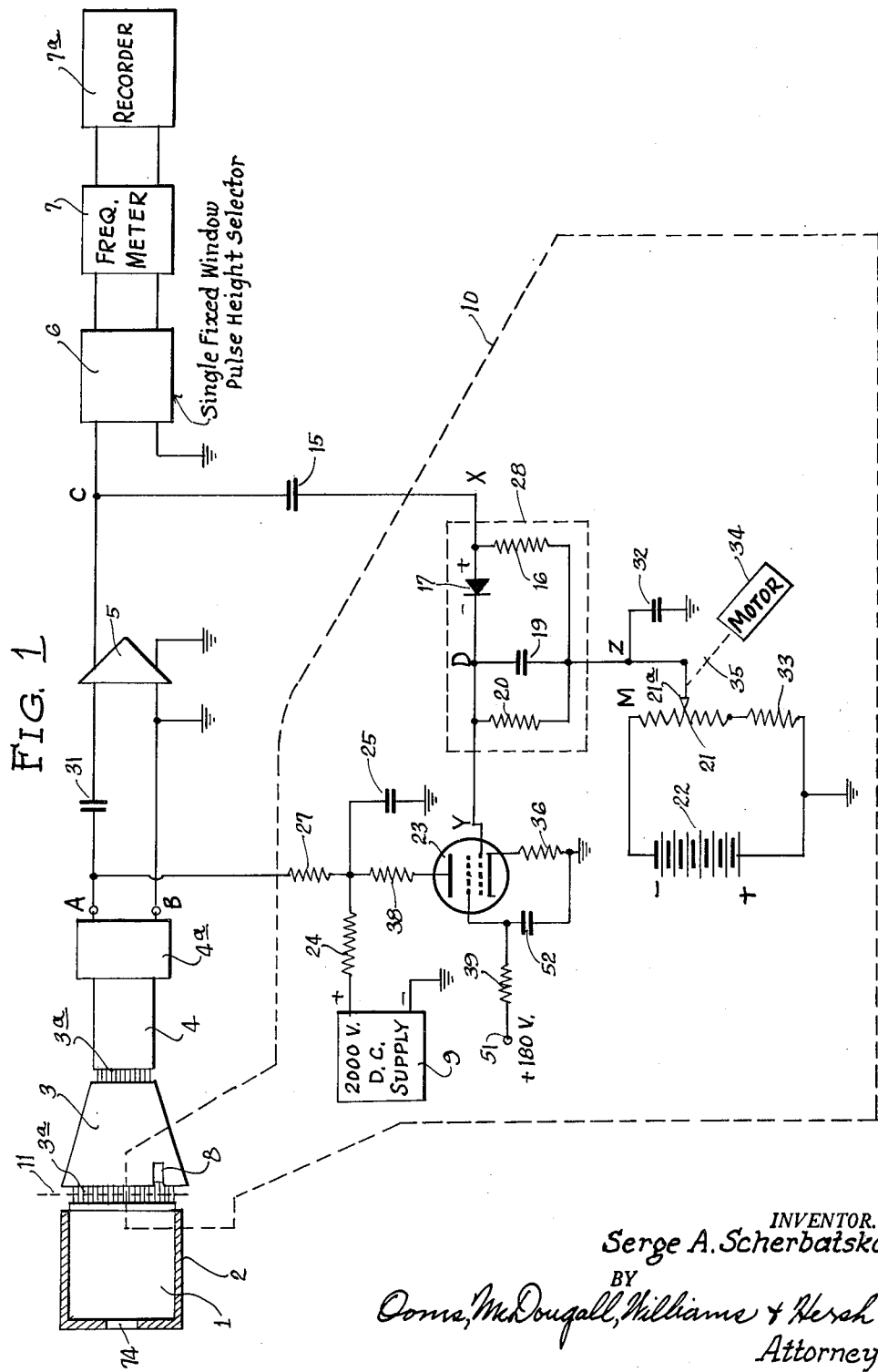

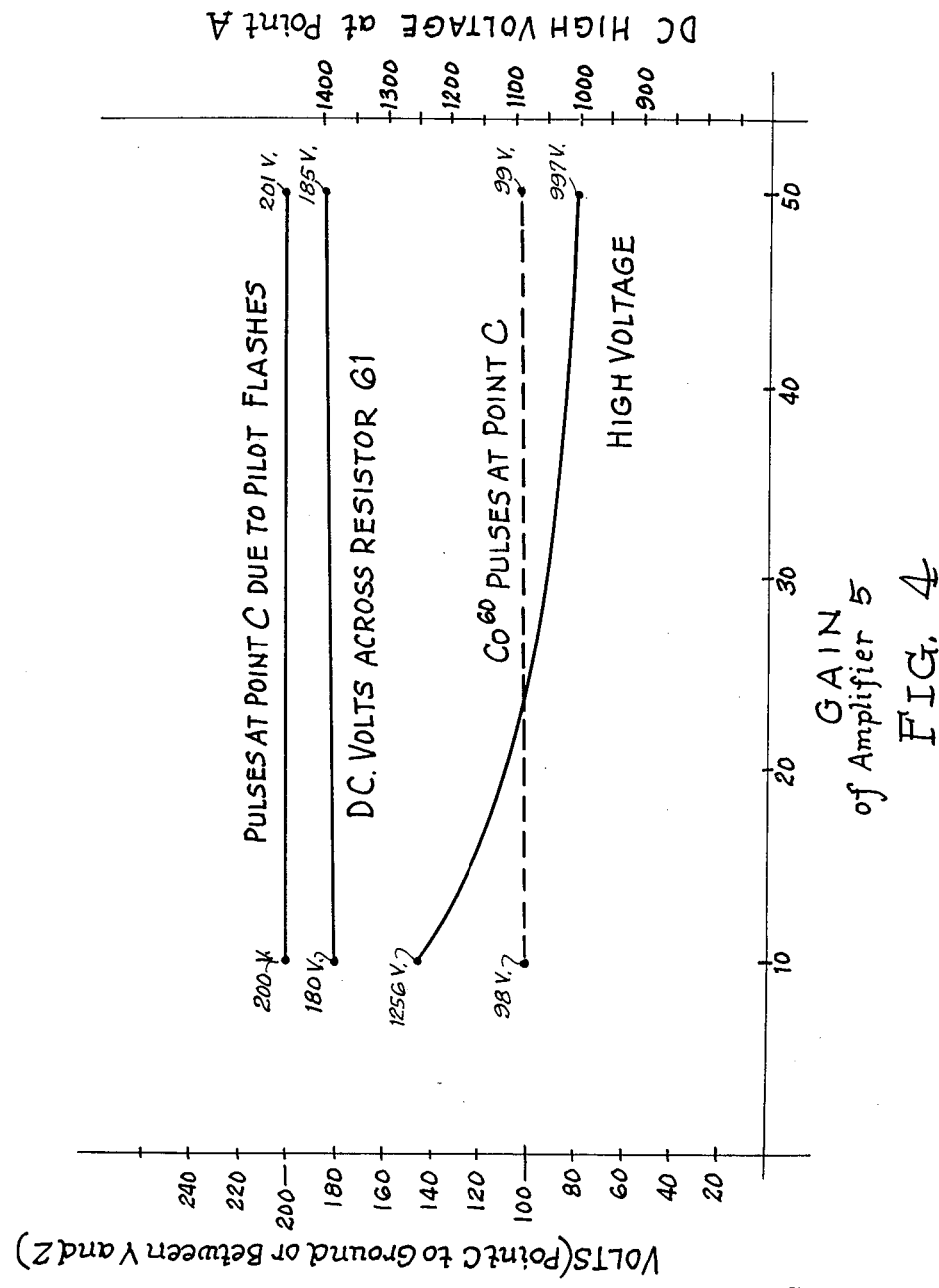

United States Patent Office 3,056,885
Patented Oct. 2, 1962

3,056,885
STABILIZED SPECTROMETER
Serge A. Scherbatskoy, 1220 E. 21st Place, Tulsa 5, Okla.
Filed Mar. 21, 1960, Ser. No. 16,500
7 Claims. (Cl. 250—71.5)

This invention relates to spectrometers for analysis of the energy distribution of detected radiation such as gamma rays, neutrons, and other products of nuclear reaction. In particular, it relates to a spectrometer having extraordinarily improved stability.

This application is a continuation-in-part of my copending application No. 655,281 entitled "Spectrometer," filed April 26, 1957, now U.S. Patent No. 2,989,637 granted June 20, 1961.

Spectrometers of the scintillation-counter type for analysis of nuclear rays are well known. They employ a crystal or "phosphor" of suitable material, such as sodium iodide or caesium iodide activated with thallium, such phosphor being optically coupled to a photomultiplier, a linear amplifier, and a pulse-height selector. The "photomultiplier" is a well-known device in which a photo-cathode produces electric pulses in the form of space-borne electrons responsively to impingement of light flashes thereon, such pulses being enormously amplified in a succession of following dynodes, by utilization of secondary-emission phenomena. At the output of the photomultiplier, the electric pulses generated in response to light flashes impinging on the photo-cathode have been amplified to a significant level, such that they can be detected and further amplified by means of a conventional linear amplifier of wide-band characteristics.

The light flashes which are detected and amplified by the photomultiplier apparatus are produced in the phosphor in response to interaction of atoms in the phosphor with nuclear rays such as gamma rays or beta rays, and the intensities of the produced light flashes are approximately proportional to the respective energies of the nuclear rays. Since the amplification which occurs in the photomultiplier and in the succeeding amplifier is essentially linear, the electric pulses fed to the pulse-height selector in a conventional nuclear spectrometer have magnitudes (peak-voltage values) approximately proportional to the energies of the detected rays which they represent.

Nuclear-ray spectrometers of the prior art have the serious disadvantage that their stability is poor. Uncontrollable "drifts" take place which cause the calibration of the instrument to change with time, often in a sporadic and unpredictable way. These unstable characteristics arise to a large degree from the fact that the amplification of a photomultiplier varies approximately as the 8th power of the voltage applied to the anode and dynodes. Hence even a very small change in the photomultiplier voltage will produce a substantial change in the magnitude of the output pulses from the photomultiplier.

Another cause of instability in nuclear-ray spectrometers is the fact that a photomultiplier contains a multiplicity of very delicate surfaces called dynodes which function as intermediate anodes and, correspondingly, as secondary emitters. The electron emission from these delicate dynode surfaces is greatly affected by aging and temperature changes. Still another source of instability in such devices is mechanical shock, which affects the focusing of the electron streams in the photomultiplier and hence causes the amplification of the device to vary.

Still another source of instability in nuclear-ray spectrometers of the prior art is the linear pulse amplifier which receives pulses from the photomultiplier output and raises them in power level before they are applied to the pulse-height selector network. These amplifiers are characterized by very rapid "rise time," and their amplification is affected by changes in supply voltage, aging of components, and by tube changes.

Scintillating phosphors can also be adapted to respond to neutrons in various known ways such as by inclusion in the phosphor of hydrogen atoms or other low-mass atoms subject to being displaced at the result of neutron collisions.

The pulse-height selector "sorts" the amplified voltage pulses which are fed to it, selectively transmitting only those pulses which fall within predetermined magnitude limits. The rate of occurrence of the pulses thus selectively transmitted is measured by a conventional instrument commonly called a frequency meter, such measurement providing an indication of the intensity of a particular component of the detected radiation. If some means is provided for measuring, either simultaneously or successively, the intensities of various components of radiation over a range of energies, the resulting information can be translated into a graph in which intensity is plotted against energy.

Some spectrometers, by employment of cathode-ray techniques, are capable of plotting such a graph directly on the face of a cathode-ray indicator tube. In other instances, the spectral data derived from the instrument is fed to an oscillographic recorder which makes a permanent record.

Nuclear spectrometers of the type just described are well known in the art and may be purchased commercially.

The instability produced by the various factors just described has required that nuclear-ray spectrometers of the prior art be frequently re-calibrated and adjusted in order to maintain a fair degree of accuracy in measurement. The primary objective of my invention is to provide a spectrometer which is inherently stable, substantially unaffected by the unstable conditions above described, and hence capable of maintaining accurate calibration over a long period of time and intensive use.

In the achievement of this major objective, it is another object of my invention to provide a spectrometer wherein variations in photomultiplier and amplifier gain have negligible effect on calibration.

Still another object of my invention is to provide a stabilized nuclear-ray spectrometer wherein the range of ray energies being measured may be varied between wide limits, with the pass band representing at all times a fixed percentage of the median energy of the rays being measured. In achieving this objective while enjoying the advantages of stabilization as above mentioned, I have made an important improvement on the basic invention described in my parent application Serial No. 655,281, now U.S. Patent No. 2,989,637, above referred to.

Other objects and advantages of my invention will be apparent from a study of the embodiments thereof herein described in detail.

In the appended drawing, FIG. 1 is a representation, partly schematic and partly diagrammatic, of a typical embodiment of my invention. FIG. 2a is a schematic diagram showing a suitable source of pilot radiation which may be used in the FIG. 1 embodiment. FIG. 2b is a diagrammatic showing of another form of pilot-radiation source which may be used in the FIG. 1 embodiment of the invention. FIG. 2c is a schematic diagram showing a novel rectifier and capacitor-charging circuit which may be substituted for one of the components in the FIG. 1 embodiment. FIGS. 3a and 3b are graphs showing typical radiation spectra produced by my invention when the scintillating phosphor thereof is irradiated with gamma rays from cobalt-60. FIG. 4 is a graph illustrating the extraordinary degree of stabilization achieved by the spectrometer of the present invention.

Referring now to FIG. 1, I show therein a scintillating crystal or phosphor 1 of conventional type, encased in a housing 2, the inner surface of which is designed to provide high optical reflectivity. Optically coupled to one face of the phosphor 1 is a light pipe 3, preferably of lucite or other plastic which is essentially transparent to visible light and at least a substantial portion of the ultraviolet spectrum. The end of light pipe 3 opposite the phosphor 1 is optically coupled to the photocathode of photomultiplier 4, mounted in a suitable base 4a which includes a conventional voltage divider designed to provide the appropriate voltages to the dynodes and anode of the photomultiplier when a voltage of approximately 1,000 volts is applied between terminals A and B.

The optical coupling between the phosphor 1, light pipe 3, and photomultiplier 4 is improved by interposing between the juxtaposed faces of the parts a suitable material such as Canada balsam or silicone fluid, such material being designated 3a on the drawing. The numeral 11 designates a light attenuator which is sometimes used in certain embodiments of my invention and which will be more fully described hereinafter.

The output terminals A and B of the photomultiplier 4 are connected to the input of a wide-band linear amplifier 5, a coupling capacitor 31 being employed to block out the D.-C. photomultiplier anode voltage from the amplifier input. Amplifier 5 should preferably be designed to have a very low output impedance, a cathode-follower output stage being a conventional means of achieving this.

The output of amplifier 5 is fed to a conventional pulse-height selector 6, of the single "fixed window" type. Such a pulse-height selector, which is a conventional element, will selectively transmit only pulses within a narrow magnitude range, suppressing all others. For example, the pulse-height selector 6 may be adjusted to pass all pulses having magnitudes between 48 and 52 volts, suppressing all pulses fed to it that have magnitudes of less than 48 volts or more than 52 volts.

The output of pulse-height selector 6 is fed to a conventional frequency meter 7, which provides an output voltage proportional to the repetition rate of pulses supplied to its input. In the embodiment illustrated, the output voltage from frequency meter 7 is fed to a conventional oscillographic recorder 7a, which is also a well-known element.

The part of the FIG. 1 apparatus which is new and which, in combination with the other elements, comprises my invention, is that which is enclosed within the dotted zone 10.

An important part of the apparatus within dotted zone 10 is a suitable source 8 of pilot light flashes, designed to provide constant-magnitude light pulses of short duration, at a low repetition rate of perhaps 10 to 20 pulses per second. The magnitude of these light pulses is, in the embodiment illustrated, somewhat greater than the magnitude of the largest light pulses produced by the phosphor 1 in response to nuclear radiation impinging thereon. Pilot light source 8 may be a small gas-filled glow discharge tube or a small auxiliary phosphor containing in its composition a radioactive element which will cause it to scintillate with constant-magnitude flashes. Detailed descriptions of suitable light sources 8 will be given presently in connection with FIGS. 2a and 2b of the drawing.

The light flashes from the pilot source 8 are guided to the photomultiplier by the light pipe 3 and, in conventional manner, produce corresponding positive voltage pulses at the point C, the output of amplifier 5, such pulses being larger in magnitude than any of the pulses produced at point C as the result of nuclear radiation impinging on phosphor 1.

The point C is connected through coupling capacitor 15 to a rectifying network generally designated by the reference numeral 28. The input of rectifier network 28, designated by the letter X, is connected to the positive terminal of a conventional semiconductor diode 17, point X being also connected to point Z through a resistor 16. The negative terminal of diode 17 is connected to point Y. A capacitor 19 and a resistor 20 are connected in parallel between points Y and Z.

Point Z is connected to ground through a capacitor 32, and point Z is also connected to the movable arm 21a of a precision potentiometer 21. One of the fixed terminals of potentiometer 21 is connected to the negative side of a battery 22. The other fixed terminal of potentiometer 21 is connected to the positive terminal of battery 22 through a fixed resistor 33, the positive terminal of battery 22 being also grounded.

It will of course be understood that the circuit element shown in the drawing as battery 22 need not necessarily be a chemical battery but may be any type of highly stable D.-C. voltage source. The potential developed by the battery 22 may, in a typical embodiment, be in the neighborhood of 250 volts, and the resistance values of potentiometer 21 and resistor 33 may be so chosen as to permit selection at the movable arm 21a of any desired voltage between perhaps −250 volts and whatever minimum value the particular application may require.

Preferably, the potentiometer arm 21a is mechanically connected to and driven by a synchronous motor 34, by means of a gear train, diagrammatically indicated by the dotted line 35, permitting the potentiometer arm 21a to undergo continuous rotation across the entire range of the fixed resistance element of the potentiometer 21. Motor-driven potentiometers of this type are well known in the art; in the present instance, the use of motor drive for the potentiometer arm 21a permits continuous "scanning" over a predetermined range of radiation energies, thus facilitating the development by recorder 7a of an intensity-energy graph for the radiation detected by the phosphor 1. The manner in which this is accomplished will be described presently.

The output terminal Y of the rectifier network 28 is connected to the control grid of a high-gain vacuum tube 23, the cathode of which is connected to ground through a conventional biasing resistor 36. The screen grid of tube 23 is connected through a resistor 39 to a suitable positive voltage source 51 and is also by-passed to ground by a capacitor 52.

The anode of tube 23 is connected to the positive side of a D.-C. voltage supply 9 through a series network comprising resistors 38 and 24. The junction of resistors 38 and 24 is by-passed to ground through capacitor 25, and such junction point is also connected through resistor 27 to point A, being the anode output terminal of the photomultiplier assembly 4 and 4a.

The D.-C. voltage supply 9 is preferably designed to have an output voltage in the neighborhood of 2,000 volts.

It should be noted in connection with the FIG. 1 apparatus and the structures shown in the other figures of the drawing that the heaters of vacuum tubes have not been shown, nor have current supplies for such heaters been indicated. Such structures are conventional and are commonly omitted from schematic diagrams in the interest of simplicity and clarity. It will similarly be understood that conventional elements shown in block form in the drawing are provided with suitable sources of energizing voltage and current. Also, it will be understood that the negative sides of all voltage sources indicated in the drawing are grounded, unless otherwise specifically indicated.

While the values of circuit elements in the apparatus just described may be varied in accordance with the needs of particular applications, in a manner which will be obvious to persons skilled in the art, I have provided below, for convenience, a table of typical values of such elements of the circuit as are not per se conventional:

| | |
|---|---|
| Resistor 16 | 0.1 megohm. |
| Resistor 20 | 10 megohms. |
| Resistor 24 | 3 megohms. |
| Resistor 27 | 0.1 megohm. |
| Resistor 33 | 5,000 ohms. |
| Resistor 36 | 37,000 ohms. |
| Resistor 38 | 0.2 megohms. |
| Resistor 39 | 39,000 ohms. |
| Potentiometer 21 | 20,000 ohms. |
| Capacitor 15 | .02 mfd. |
| Capacitor 19 | 4 mfd. |
| Capacitor 32 | 10 mfd. |
| Capacitor 52 | 0.22 mfd. |
| Tube 23 | Type 6136. |
| Diode 17 | A silicon diode such as type 1N2134A. |

The operation of the stabilizing unit 10, as above described, is as follows:

The pilot light source 8 produces, at a low repetition rate, short constant-magnitude light pulses of size exceeding the largest light flashes generated in the phosphor 1 by nuclear radiation impinging thereon. These flashes from pilot source 8 produce positive voltage pulses at the point C, and such pulses are transmitted through the coupling capacitor 15 and diode rectifier 17 to the capacitor 19.

For purposes of illustration, let us assume that the positive pulses at the point C due to flashes from the pilot light source 8 have a peak magnitude of +200 volts. In the apparatus shown, these pulses will charge the capacitor 19 to a voltage slightly less than 200 volts. The actual D.-C. voltage that will build up across capacitor 19 may be in the neighborhood of 190 volts, the exact value depending on the degree of excellence of the rectifier 17, and the relative resistances of the resistors 16 and 20. Since the resistance of resistor 20 is many times that of resistor 16, the effective D.-C. voltage across capacitor 19, assuming 200-volt pulses at point C, will normally be about 190 volts.

Let us assume that the position of the arm 21a on potentiometer 21 is such that the D.-C. voltage relative to ground a point Z is −195 volts. This will result in a bias of −5 volts on the control grid of tube 23, since the D.-C. voltage across capacitor 19 will "buck" the negative D.-C. voltage at point Z, being in series-opposed relation thereto. Tube 23 will as a result be slightly conducting, and it will draw sufficient anode current to provide approximately 1,000 volts drop across resistor 24. Thus the voltage at point A will be approximately +1,000 volts.

Under the conditions stated, the system will be in equilibrium. Now suppose, for example, that the amplification of the photomultiplier 4 or of the amplifier 5 should increase due to some unpredictable drift condition. This will cause the positive pulses at point S to increase above the peak value of 200 volts. As a result, the D.-C. voltage across capacitor 19 will increase proportionately, the tube 23 will become slightly more conductive, the voltage drop across resistor 24 will become slightly higher, and the photomultiplier polarizing voltage at point A will be slightly reduced. The resulting reduction in the amplification of photomultiplier 4 will thus tend to offset the accidental gain increase mentioned earlier in this paragraph, and the system will be restored to equilibrium with no significant change in the magnitude of the pulses at point C due to flashes from the pilot source 8. Because of the very high gain of tube 23, this stabilizing action is very effective, so that large changes in the amplification of the photomultiplier 4 or the amplifier 5 will result in only a minute net change in the amplification of the system as a whole.

Let us continue with the assumption that the system is in equilibrium, with the electric pulses at point C due to the pilot source 8 having a peak magniude of +200 volts. Let us further assume that the pulse-height selector 6 is so adjusted as to pass all pulses between 48 and 52 volts in magnitude—i.e., the window pass band has a median value of 50 volts. Under these circumstances, any light flashes reaching the photomultiplier 4 that have an intensity of one-quarter the light intensity of the flashes from the pilot source 8 will produce voltage pulses at the point C equal to one-fourth of 200 volts—i.e., 50 volts—and such pulses will pass through the pulse-height selector 6, actuating the frequency meter 7 and recorder 7a.

Assume now that the arm 21a of potentiometer 21 is moved so that the voltage between point Z and ground is reduced from −195 volts to −100 volts. After equilibrium has been re-established, which will occur in a very short time, the over-all gain of the photomultiplier 4 and the amplifier 5 will be reduced to such a degree that the pulses at point C due to the flashes from pilot source 8 will have a peak value of only about +103 volts, and the D.-C. voltage across capacitor 19 will be reduced approximately in proportion. Of course the pulses at point C due to flashes in the phosphor 1 resulting from nuclear interactions therein will also be proportionately reduced in magnitude, so that pulses derived from flashes in phosphor 1 having about one-half the effective intensity of the light pulses from the pilot source 8 will produce electric pulses at C of peak value in the neighborhood of 50 volts. Hence it will now be those pulses that will pass through the pulse-height selector 6 and actuate the frequency meter 7 and recorder 7a. Thus, by varying the position of the potentiometer arm 21a, and hence varying the reference voltage derived therefrom, the range of detected radiation energies selected and recorded by the spectrometer may be effectively varied.

In this connection, it is noteworthy that the percentage width of the "window" represented by pulse-height selector 6 remains constant. In practice, this is a very important and advantageous feature. Thus, if the pulse-height selector 6 is adjusted, as in the example given, to have a pass band extending 4% above and 4% below a median value, the instrument will, for example, measure radiation having energies in the range between 0.96 mev. and 1.04 mev. when the potentiometer arm 21a is set for a median detecting level of 1 mev. When the potentiometer arm 21a is set, on the other hand, to detect radiations in the neighborhood of 5 mev., the energy range of radiations passed by the pulse-height selector 6 and hence recorded will extend from 4.8 mev. to 5.2 mev. Thus the percentage resolution of the spectrometer's measurements is constant throughout its operating range.

The constant-percentage pass-bank characteristic just described in connection with the present invention is a feature which the present apparatus has in common with the spectrometer disclosed and claimed in my aforementioned parent application No. 655,281, now U.S. Patent No. 2,989,637. The present invention, however, represents a vitally important improvement over the disclosure of my said parent application, in that the range of ray energies detected and measured by the spectrometer herein disclosed depends solely on the value of reference voltage selected by the potentiometer 21, and is not affected by uncontrollable drift phenomena. In the present invention, the gain of the photomultiplier 4 and amplifier 5 is at all times stabilized because the voltage pulses derived from the pilot light source 8 and appearing at point C are continuously compared to, and regulated by, the standard voltage of the precision potentiometer. The fact that the amplification of the photomultiplier varies according to the 8th power of the D.-C. voltage applied to it in no way affects the accuracy of the instrument. In the present invention, if an accuracy of 1% or 2% is desired in the calibration, then it is merely necessary to maintain the reference voltage supplied by the potentiometer 21 accurate to within 1% or 2%. No 8th power is involved, but only the 1st power. Thus my present instrument is characterized by very high long-term stability. Indeed, in my present instrument, it is possible to replace damaged photomultiplier or amplifier tubes with new ones without significantly affecting the calibration of the instrument—a result completely impossible with prior-art spectrometer circuits.

Although the arrangement shown in FIG. 1 is very satisfactory in performance, it can be improved by using a slightly more complicated circuit in the rectifier unit indicated by the dotted enclosure 28. Such an improved circuit is shown in FIG. 2c.

In the arrangement shown in FIG. 1, the rectifier 17 and capacitor 19 may tend to clip the positive pulses at the point C unless the output impedance of the amplifier 5 is very low. Also, if the spectrometer is to be used for measuring very weak radiation, it may be affected by cosmic rays, since only a few high-energy cosmic rays interacting with the phosphor 1 may charge the capacitor 19 to a voltage above that required for the desired equilibrium condition. To eliminate these two effects, the circuit of FIG. 2c may be substituted for the circuit shown in FIG. 1 within the dotted enclosure 28. In FIG. 2c, the point X of FIG. 1, instead of running to a diode rectifier, is connected through a resistance-capacitance network to the control grid of a triode tube 55, which may be a 6J4 or similar type. The resistance-capacitance network is T-connected and consists of resistors 56 and 57 in the series arms and a capacitor 58 in the shunt arm, the lower side of capacitor 58 being grounded. Point X is also connected to point Z through a resistor 59. The cathode of tube 55 is connected to point Z through a resistor 61 and is connected to ground through a capacitor 42. The plate of tube 55 is connected to the positive terminal of a suitable voltage supply 62 preferably delivering about 400 volts. Terminal Y, which, it will be recalled, is joined to the control grid of tube 23 (FIG. 1), is connected to the cathode of tube 55.

Typical values of the components in FIG. 2c may be as follows:

Resistor 56 _____ ohms __ 10,000
Resistor 57 _____ ohms __ 47,000
Resistor 59 _____ ohms __ 82,000
Resistor 61 _____ megohms __ 5
Capacitor 42 _____ mfd __ 4
Capacitor 58 _____ mmfd __ 100

The operation of the FIG. 2c rectifier network is similar in principle to that of the rectifier unit 28 in FIG. 1, although it differs in details. When a pilot source 8 of the FIG. 2a type is used, the electric pulses appearing at point C of FIG. 1 as the result of pilot light flashes have a duration of several microseconds. As a result they pass without difficulty through the resistance-capacitance network 56, 57, 58 and are applied to the control grid of tube 55, which acts as a cathode rectifier. Each voltage pulse on the grid of tube 55 is accompanied by a surge of anode current that charges capacitor 42 and, once equilibrium is reached, results in a steady flow of current through resistor 61, producing a D.-C. voltage thereacross which is generally proportional to, and slightly less than, the peak amplitude of the pulses fed in at point X.

It should be noted that capacitor 42 is, in FIG. 2c, returned directly to ground, rather than being bridged across resistor 61. This is an alternative connection shown in FIG. 2c simply to illustrate a variant circuit applicable, if desired to either the FIG. 1 or the FIG. 2c networks. Returning the capacitor 42 (or capacitor 19 in FIG. 1) to ground results in its acquiring a smaller quantity of charge than it will have if bridged directly across resistor 61 (or, in FIG. 1, resistor 20). Its mode of operation, however, is the same in either connection it being operative to maintain the current through resistor 61 an essentially constant D.-C. flow even though the signal actuating the grid of tube 55 is in the form of a train of short-duration pulses.

The function of the resistance-capacitance network 56, 57, 58 is to prevent the rectifier network from being affected by cosmic-ray impulses which in many applications will occasionally strike the phosphor 1 and produce at point C voltage pulses of amplitude even exceeding that of the pulses derived from the pilot flashes. Because such cosmic-ray pulses are very brief in duration, they will be effectively kept away from the grid of tube 55, due to the relatively long response time of the resistance-capacitance network.

In applications wherein the instrument will not be subjected to interference from cosmic rays, as, for example, when the phosphor 1 is located in a shielded room, cave, or bore hole, the resistance-capacitance network 56, 57, 58 may be omitted, point X in such case being connected directly to the grid of tube 55.

In addition to providing effective protection against cosmic-ray interference, the alternative rectifier network 28 shown in FIG. 2c has the added advantage of possessing a high input impedance, thus insuring that the rectifier network will not clip pulses appearing at point C.

In FIGS. 2a and 2b, I have illustrated alternative arrangements which may be used as the pilot source 8 for production of pilot flashes.

In the FIG. 2a arrangement, the pilot light source 8 consists of a glow discharge tube 27 of the sort typified by General Electric type AR4, in conjunction with appropriate apparatus to cause the tube to generate light flashes of the appropriate amplitude and duration. One terminal of the glow tube 27 is grounded, and the other is connected to the positive terminal 63 of a suitable D.-C. voltage source developing about 400 volts through a series network comprising a resistor 64, an adjustable resistor 65, and an inductor 66. Between the junction of resistors 64 and 65 and ground, a capacitor 67 is connected. Typical values for the elements shown in FIG. 2a may be as follows:

Resistor 64 _____ megohms __ 70
Resistor 65 _____ ohms __ 10,000
Inductor 66 _____ mh __ 25
Capacitor 67 _____ mfd __ .0015

Persons skilled in the art will realize that the circuit shown in FIG. 2a comprises a relaxation oscillator. With the suggested circuit constants, the glow tube 27 will produce light flashes of substantial intensity at a repetition rate of 15 to 20 pulses per second, each pulse lasting approximately 30 microseconds. The tube 27 is enclosed in a light-tight housing having one open face, which is closed by a light attenuator 29 which, in the example being described, may consist of about twelve layers of white translucent Teflon sheeting, each sheet being about 10 mils in thickness.

The intensity of the light pulses generated by the FIG. 2a apparatus may be adjusted within reasonable limits by adjustment of the variable resistor 65.

While it is not essential in the operation of my invention that the pilot-light pulses stimulate the photomultiplier 4 more intensely thatn any of the flashes generated in the phosphor 1, the circuitry is simpler when the pilot-light pulses are so designed. The illustrated embodiment of the invention does use a circuit wherein it is necessary that the pilot-light pulses at the point C be the largest pulses generated by the system. At the same time, to provide optimum accuracy of spectral analysis, it is desirable that the intensity of the pilot flashes be only slightly greater than the intensity of the flashes in phosphor 1 generated by the most energetic radiation to be detected. To achieve this objective in a practical design of my invention, the characteristics of the light attenuator 29 may be appropriately adjusted, so as to insure that the intensity of the flashes from flow tube 27 striking the photomultiplier will be just a few percent greater than the brightest flashes produced in the phosphor 1 as the result of radiation being detected. It will be understood, of course, that the apparatus of FIG. 2a is inserted in the light pipe 3 in such a way that the light passing through the attenuator 29 is transmitted directly to the photomultiplier 4.

It will be understood that the use of pilot pulses having a duration of several microseconds is desirable to insure complete freedom from cosmic-ray interference, since the resistance-capacitance network 56, 57, 58 in the FIG. 2c apparatus may be designed so as readily to pass voltage pulses of several microseconds duration, while effectively suppressing high-energy pulses from cosmic rays, which will be only a fraction of a microsecond in duration.

An alternative type of pilot source 8 for generation of pilot light flashes is shown in FIG. 2b. It consists of a small scintillating phosphor 70, which may be a sodium iodide crystal activated with thallium, in which a minute amount of lead-210 is included in the composition. Lead-210 is radioactive, emitting alpha particles of approximately 5 mev. energy, which make the crystal 70 scintillate quite strongly. The crystal 70 is preferably very small in size and, in at least one dimension, is very thin, preferably only a fraction of a millimeter. This construction makes the crystal very insensitive to gamma rays. The crystal 70 is packed in a conventional container 71 filled with a reflecting substance 72 which directs the flashes to the right as viewed in FIG. 2b, the right-hand end of the container 71 being closed with a glass window 73 of a type transparent to ultraviolet light, the entire assembly being hermetically sealed.

The light pulses emitted by the assembly of FIG. 2b are, to a very close approximation, perfectly uniform in intensity, since practically all of the alpha rays emitted by the lead-210 are totally absorbed within the crystal 70. Substantially no light flashes weaker than the uniform value are emitted by the FIG. 2b assembly, so that it causes essentially on interference with the spectrum of nuclear rays to be analyzed.

Since the flashes emitted by the FIG. 2b assembly have a brightness characteristic of 5 mev. energy, and since in the illustrated embodiment the pilot flashes should be more intense than any of the flashes reaching the photomultiplier as the result of unknown radiation interacting with phosphor 1, a spectrometer using a FIG. 2b type of pilot source may not be used for analysis of radiation energies above 5 mev. unless special measures are taken. Should exploration of the higher energy ranges be desired in this situation, it can be achieved by interposing an optical attenuator 11 between the main phosphor 1 and the light pipe 3, in the FIG. 1 apparatus. This optical attenuator may either be fixed and, for example, consist of a number of thin sheets of Teflon, or it may be variable, consisting of an adjustable iris on two crossed Polaroid filters, thus providing convenience of adjustment. In the use of an optical attenuator 11, the flashes produced in phosphor 1 may be diminished in intensity by any desired factor, thus making it possible to analyze any desired range of energies. For example, if analysis of energies up to 10 mev. is desired, the attenuator 11 may be adjusted so as to reduce by half the intensity of the flashes in phosphor 1 in the course of their passage to the photomultiplier 4.

Other variations and modifications in the apparatus of my invention may be employed if desired. For example, instead of adjusting the high voltage applied to the photomultiplier, the response of the photomultiplier may be varied by the provision of an adjustable iris between light pipe 3 and photomultiplier 4, the aperture of which is controlled by a servo motor operated responsively to changes in the anode current of tube 23. Also, if analysis of nuclear radiations exceeding 5 mev. is not required, the lead-210 described in connection with FIG. 2b may be introduced directly into the phosphor 1, thus providing event greater stability for the system since, in that manner, variations in the scintillating efficiency of phosphor 1 would also be corrected for. This last-mentioned modification has been used very successfully. In most cases, however, it is believed that the use of a separate pilot source 8 is to be preferred, because of the greater flexibility in operation thereby made possible.

It will of course be understood that the lead-210 herein suggested as a source of pilot radiation may be replaced by any of the other well-known radioactive isotopes which are alpha-emitters or beta-emitters.

The types of pilot-flash sources herein suggested are of course merely illustrative; other suitable sources for such radiation will readily occur to skilled readers.

In some cases, rather than interposing the pilot-flash source 8 in the light pipe 3, it may be preferable to provide a glass window 74 in the housing of main phosphor 1 and so position the pilot source 8 that its flashes will shine through the phosphor 1.

It is desirable to insure that the full voltage output from supply 9 is not applied to the photomultiplier anode at point A when the apparatus is first turned on, since damage to delicate components or unstable starting might result. To this end, the voltage supply 9 may be provided with a suitable time-delay relay insuring that supply 9 will not be turned on until after all the other components of the system have warmed up and are operative. Alternatively, a voltage regulator tube of the corona-discharge type, which will limit the voltage across it to about 1,500 volts, may be connected in the FIG. 1 apparatus between the junction of resistors 24 and 27 and ground. A suitable tube for this purpose is the Victoreen type GV-3A.

FIGS. 3a, 3b, and 4 are illustrative of the performance characteristics of my invention.

FIG. 3a is a graph in which energy in mev. is plotted against ray intensity in pulses per second, when the phosphor 1 is irradiated with gamma rays from cobalt-60. The sharp peak 81 on FIG. 3a is the peak produced by light flashes from a pilot source of the FIG. 2a type, and the twin peaks 82 are the usual peaks representative of the gamma rays from cobalt-60. The lower energy region of the FIG. 3a graph is occupied by various rays representing degraded radiation.

FIG. 3b shows the same spectrum as FIG. 3a, but illustrates the behavior of my invention as used with a pilot-flash source of the FIG. 2b type. It will be noted that the peak representing the flashes from the pilot source is somewhat broader and less sharply defined when a pilot source of the FIG. 2b type is used.

FIG. 4 is a graph showing how various parameters in a spectrometer according to my invention are affected by changes in the gain of amplifier 5. In studying FIG. 4, it should be borne in mind that the indicated changes in the gain of amplifier 5 are merely representative of what will in practice be encountered in the nature of uncontrollable drifts which may affect the gain of either the photomultiplier 4 or the amplifier 5.

The gain of amplifier 5 is plotted on the horizontal axis of FIG. 4 and was, in the preparation of FIG. 4, varied over a range from a voltage gain of 10 to a voltage gain of 50. In other words, the over-all gain of the photomultiplier and amplifier were, in the preparation of FIG. 4, varied through a range of five to one—a variation vastly greater than would ever be caused by drifts. The top curve on FIG. 4 represents the peak voltage, measured at point C (FIG. 1), of the pulses produced by pilot flashes. The extraordinary stability of a spectrometer embodying my invention is shown by the fact that this curve is almost perfectly horizontal, the peak value of the pulses having changed only one volt (out of 200) when the gain of amplifier 5 was varied throughout the entire range from 10 to 50.

The second curve from the top on FIG. 4 represents the D.-C. voltage measured across resistor 61. (FIG. 4 was prepared with an embodiment of the invention wherein the FIG. 2c form of rectifier unit was used.) As will be noted from FIG. 4, the voltage across resistor 61 shifted from a value of 180 volts at an amplifier gain of 10 to a value of 185 volts at an amplifier gain of 50.

The dotted curve on FIG. 4 represents the peak voltage produced at point C (FIG. 1) as the result of irradiation of phosphor 1 by gamma rays from cobalt-60, the curve specifically representing the pulses produced by the 1.33 mev. gamma rays of cobalt-60. It will be noted that the peak voltage of these pulses was 98 volts when the gain of amplifier 5 was set at 10 and increased to only 99 volts—a change of only about 1%—when the amplifier gain was raised to 50.

Skilled readers who are familiar with the characteristic instability and calibration uncertainty exhibited by prior-art nuclear spectrometers will appreciate from a study of FIG. 4 that the present invention has achieved a degree of stability and calibration precision vastly superior to anything possible in the prior art.

From the foregoing description it will be understood that my invention is characterized by stabilization of the total light-to-voltage sensitivity of the system, by which is meant the total amount of amplification of the signal which initially is a light pulse impinging upon the photo-cathode and which is thereupon reproduced in the form of an electric pulse at the amplifier output. This total light-to-voltage gain, which I shall refer to as "light sensitivity," represents the sensitivity of the photo-cathode multiplied by the gain in the photomultiplier multiplied by the gain in the amplifier.

It will be understood that the foregoing description of specific embodiments of my invention is merely illustrative; it is my desire that the scope of my invention be determined primarily by reference to the appended claims.

I claim:

1. In a scintillation spectrometer of the type in which incoming radiation to be analyzed produces a first electric pulse train and pilot radiation produces a second electric pulse train, means for analyzing the energy distribution of incoming radiation which comprises: means producing light flashes representing said incoming radiation and said pilot radiation, photomultiplier means optically coupled to said last-mentioned means operative to produce said first and second pulse trains, amplifier means fed by said photomultiplier means operative to amplify and transmit said first and second pulse trains, pulse-height selector means connected to the output of said amplifier means and operative selectively to transmit pulses in said first train having magnitudes within a predetermined range, means connected to the output of said amplifier means for developing a voltage representative of the magnitude of the pulses in said second train at said amplifier output, an adjustable source of reference voltage, means operative responsively to both said reference voltage and said representative voltage to govern the operation of said photomultiplier and thereby to maintain substantially constant the ratio between said representative voltage and said reference voltage, and means for adjusting said reference-voltage source to vary said reference voltage.

2. In a scintillation spectrometer of the type in which incoming radiation to be analyzed produces a first electric pulse train and pilot radiation produces a second electric pulse train, means for analyzing the energy distribution of incoming radiation which comprises: means producing light flashes representing said incoming radiation and said pilot radiation, photomultiplier means optically coupled to said last-mentioned means operative to produce said first and second pulse trains, said photomultiplier means including a voltage-supply means therefor, amplifier means fed by said photomultiplier means operative to amplify and transmit said first and second pulse trains, pulse-height selector means connected to the output of said amplifier means and operative selectively to transmit pulses in said first train having magnitudes within a predetermined range, means fed by said pulse-height selector means for measuring the repetition rate of said selectively transmitted pulses, means connected to the output of said amplifier means for developing a voltage representative of the magnitude of the pulses in said second train at said amplifier output, an adjustable source of reference voltage, and means operative responsively to both said reference voltage and said representative voltage and connected to said photomultiplier voltage-supply means operative to control the voltage applied to said photomultiplier to maintain substantially constant the ratio between said representative voltage and said reference voltage.

3. In a scintillation spectrometer of the type in which incoming radiation to be analyzed produces a first electric pulse train and pilot radiation produces a second electric pulse train, means for analyzing the energy distribution of incoming radiation which comprises: means producing light flashes representing said incoming radiation and said pilot radiation, photomultiplier means optically coupled to said last-mentioned means operative to produce said first and second pulse trains, amplifier means fed by said photomultiplier means operative to amplify and transmit said first and second pulse trains, pulse-height selector means connected to the output of said amplifier means and operative selectively to transmit pulses in said first train having magnitudes within a predetermined range, means connected to the output of said amplifier means for developing a voltage representative of the magnitude of the pulses in said second train at said amplifier output, a source of reference voltage, and means operative responsively to both said reference voltage and said representative voltage to govern the operation of said photomultiplier and thereby to maintain substantially constant the ratio between said representative voltage and said reference voltage.

4. In a scintillation spectrometer of the type in which incoming radiation to be analyzed produces a first electric pulse train and pilot radiation produces a second electric pulse train, means for analyzing the energy distribution of incoming radiation which comprises: means producing light flashes representing said incoming radiation and said pilot radiation, photomultiplier means optically coupled to said last-mentioned means operative to produce said first and second pulse trains, amplifier means fed by said photomultiplier means operative to amplify and transmit said first and second pulse trains, pulse-height selector means connected to the output of said amplifier means and operative selectively to transmit pulses in said first train having magnitudes within a predetermined range, means fed by said pulse-height selector means for measuring the repetition rate of said selectively transmitted pulses, means connected to the output of said amplifier means for developing a voltage representative of the magnitude of the pulses in said second train at said amplifier output, an adjustable source of reference voltage, means operative responsively to both said reference voltage and said representative voltage to govern the operation of said photomultiplier and thereby to maintain substantially constant the ratio between said representative voltage and said reference voltage, and means for systematically varying said reference voltage between predetermined limits.

5. The apparatus defined in claim 1 wherein said adjustable reference-voltage source comprises a source of fixed voltage and a potentiometer in circuit therewith, and wherein said adjusting means comprises a means for adjusting the voltage output of said potentiometer.

6. The apparatus of claim 5 wherein said means for adjusting the voltage output of said potentiometer is motor-driven and is operative to adjust the output voltage of said potentiometer in a systematic pattern as a function of time, to provide a reference voltage which varies periodically between predetermined limits.

7. The apparatus of claim 3 wherein said means for developing a voltage representative of the magnitude of the pulses in said second train at said amplifier output includes a time-constant network rendering such means insensitive to the effect of random pulses at said amplifier output having greater magnitude and substantially shorter duration than the pulses in said second train.

References Cited in the file of this patent

UNITED STATES PATENTS

| | | |
|---|---|---|
| 2,517,404 | Morton | Aug. 1, 1950 |
| 2,700,108 | Shamos | Jan. 18, 1955 |
| 2,728,863 | Goodyear | Dec. 27, 1955 |
| 2,742,576 | Dandle | Apr. 17, 1956 |
| 2,758,217 | Scherbatskoy | Aug. 7, 1956 |
| 2,979,617 | Somerville | Apr. 11, 1961 |

OTHER REFERENCES

Upson et al.: Analyzing Low-Energy Gamma Emitters in a Radionuclide Mixture, Nucleonics, April 1955, pp. 38 to 41.

UNITED STATES PATENT OFFICE
CERTIFICATE OF CORRECTION

Patent No. 3,056,885            October 2, 1962

Serge A. Scherbatskoy

It is hereby certified that error appears in the above numbered patent requiring correction and that the said Letters Patent should read as corrected below.

Column 1, line 46, beginning with "Nuclear-ray spectrometers" strike out all to and including "by tube changes." in column 2, line 3, and insert the same after "purchased commercially.", in line 29, same column 2; column 5, line 45, for "a" read -- at --; line 58, for "S" read -- C --; column 6, line 54, for "pass-bank" read -- pass-band --; column 9, line 42, for "on" read -- no --.

Signed and sealed this 26th day of March 1963.

(SEAL)
Attest:

ESTON G. JOHNSON            DAVID L. LADD

Attesting Officer            Commissioner of Patents